Nov. 25, 1969  L. C. JUGLE  3,479,869
AIR POLLUTION MEASURING SYSTEM

Filed April 3, 1967  3 Sheets-Sheet 1

INVENTOR
LAWRENCE C. JUGLE
BY
ATTORNEY

Nov. 25, 1969  L. C. JUGLE  3,479,869
AIR POLLUTION MEASURING SYSTEM
Filed April 3, 1967  3 Sheets-Sheet 3

INVENTOR
LAWRENCE C. JUGLE
BY
ATTORNEY

United States Patent Office 3,479,869
Patented Nov. 25, 1969

3,479,869
AIR POLLUTION MEASURING SYSTEM
Lawrence C. Jugle, Niagara Falls, N.Y., assignor to
Union Carbide Corporation, a corporation of New
York
Filed Apr. 3, 1967, Ser. No. 628,027
Int. Cl. G01w 1/02
U.S. Cl. 73—170          1 Claim

ABSTRACT OF THE DISCLOSURE

A means for measuring the air pollution generated by a single pollution source comprising a wind sensitive control device which electrically activates one or more pollution measuring instruments when the atmospheric wind is in a suitable direction.

BACKGROUND OF THE INVENTION

Field of the invention

This invention relates to a wind direction detection device which may preferably be used to control the operation of an air pollution measuring device.

Description of the prior art

Air pollution control has fast become a major concern of government and industry in the United States. Because of its importance, many solutions have been proposed and many resources have been mobilized to combat this problem.

Attention invariably is directed to industry, particularly large manufacturing complexes, when the sources of the soot are being sought. Each industry has created and is continuing to improve various means whereby waste matter produced during normal industrial operation is precluded from entering the atmosphere.

Many devices designed to provide some measure of control have been fairly successful. One such device is the subject matter of copending U.S. application, Ser. No. 605,260 entitled "Air Pollution Control System," filed Dec. 28, 1966 and now abandoned. In addition, a wide variety of devices which measure the degree of air pollution are known. A fundamental problem which still remains, however, is the ability to accurately measure the degree of pollution in the atmosphere caused by any one source. If such a problem were solved, not only would a pollution source be readily detected, but the success of any control device which is installed at the source could easily and precisely be observed.

The measuring devices currently in use are not equipped to be selective and measure waste matter in the air over a long period of time without any provision for the direction from which the contamination originated. Thus, if a measuring device is placed near a factory, some indication of the quantity of pollution being generated by the factory will only be obtained when the wind is in a preferable direction, that is, directly toward the device and away from the factory. Yet the same instrument continues to function when the wind changes direction and so the data obtained at the end of a time interval must be attributable to other sources as well as to the factory. It cannot be determined, for example, how much of the measured pollution is generated by a factory located several miles in the opposite direction and how much originates at the factory adjacent the measuring device.

SUMMARY OF THE INVENTION

It is a primary object of this invention, therefore, to provide an air pollution measuring system which is capable of accurately determining the pollution in the air due to any one source.

It is a more specific object of this invention to provide a control device which is capable of sensing wind direction and simultaneously controlling an electrical instrument.

Broadly, the invention comprises a wind direction sensing device which, in accordance with the direction of the wind, either activates or deactivates an electrical instrument, preferably an air pollution measuring instrument, with which it is in communication. Thus, if the wind has a desirable direction as, for example, directly past a source which is to be measured and into the measuring instrument, the instrument will be turned ON. If the wind then shifts, the measuring instrument is automatically turned OFF. In this manner, contaminated air from only a single source may be measured. It will, of course, be fully appreciated from the detailed discussion hereinafter set forth that activation of the measuring instrument may occur over a range of a few degrees of wind shift to as much as ninety degrees or more.

The invention will be more readily understood by referring to the drawings, wherein.

DESCRIPTION OF THE PREFERRED EMBODIMENTS

Figure 1:
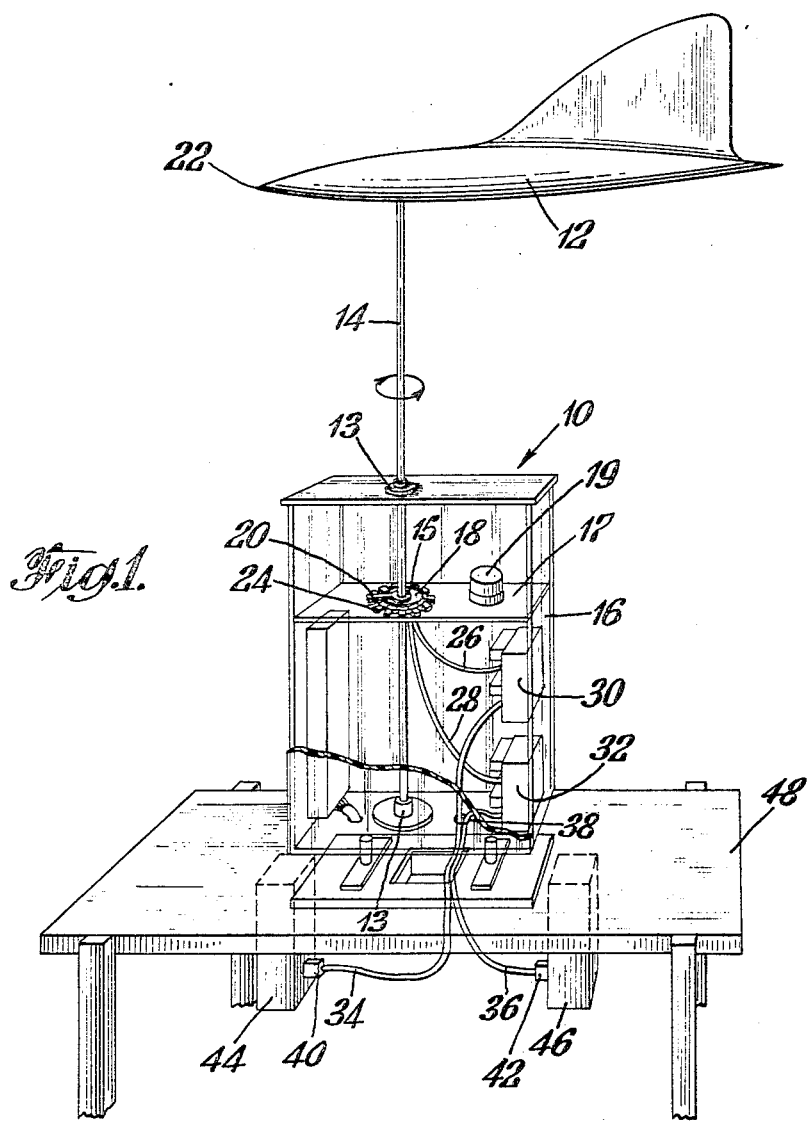
FIGURE 1 is a perspective view of a control device typically employed in the system of the invention.
Figure 2:
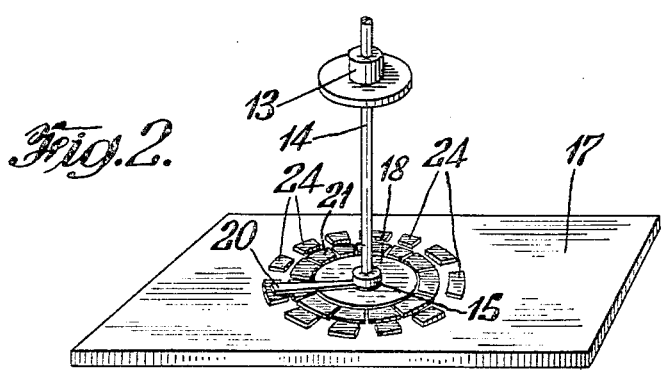
FIGURE 2 is an enlarged view of a segment of FIGURE 1.

In FIGURE 1, there is illustrated a control device 10 comprising a wind sensor 12, a support means such as a rod 14, which is rigidly secured to the sensor 12, and a housing means 16. The rod 14 is rotatably secured to the housing means 16 such as by bearings 13, 15, as best illustrated in FIGURE 2. Dial 18 is affixed to the top of the plate means 17 which is secured to the inside of the housing means 16, and an indicator 20 which is in direct communication with the ring 21 is also firmly secured to, but electrically insulated from, the rod 14. A level 19 is positioned on plate 17 and is used to maintain the plate in a nearly horizontal position so that increased accuracy of measurement may be achieved. The indicator moves in tandem with the sensor 12, it being so positioned as to be always pointing in the same direction as the tip 22 of the sensor 12. A plurality of contact points 24 are located at specific positions about the periphery of the dial 18. Conducting means designated generally by the numerals 26, 28 are electrically connected to relays 30, 32 which are mounted on the housing means 16. Additional conducting means 34, 36 which are also connected to the relays 30, 32, respectively, are channeled through the opening 38 in the housing means 16 to headers 40, 42 positioned on pollution measuring instruments 44, 46. A platform 48 may be used to support the control device 10.

In operation, a wind acting upon the control device 10 rotates the sensor 12 so that the tip 22 is pointing in the direction of the air flow. Simultaneous with the movement of the sensor 12, indicator 20 moves along the periphery of dial 18 until the sensor is aligned with the wind direction, at which time the indicator mates with one of the contact points 24. An electrical signal is then brought from a power supply (see FIG. 3) through the indicator 20 to the contact point 24. If the particular contact point which is mated with the indicator is in a position on the dial representative of a wind direction which is suitable, the electrical signal is carried to either relay 30, 32, and through the corresponding conducting means 34, 36 to activate either measuring instruments 44, 46 to an "ON" state. If the wind thereafter shifts, the sensor 12 realigns itself and carries the indicator 20 to a different contact point 24, which, if it is not in the proper relative position, will not carry the signal to a relay and, thus, the measuring instruments will not be activated and will be in an "OFF" state.

Figure 3:
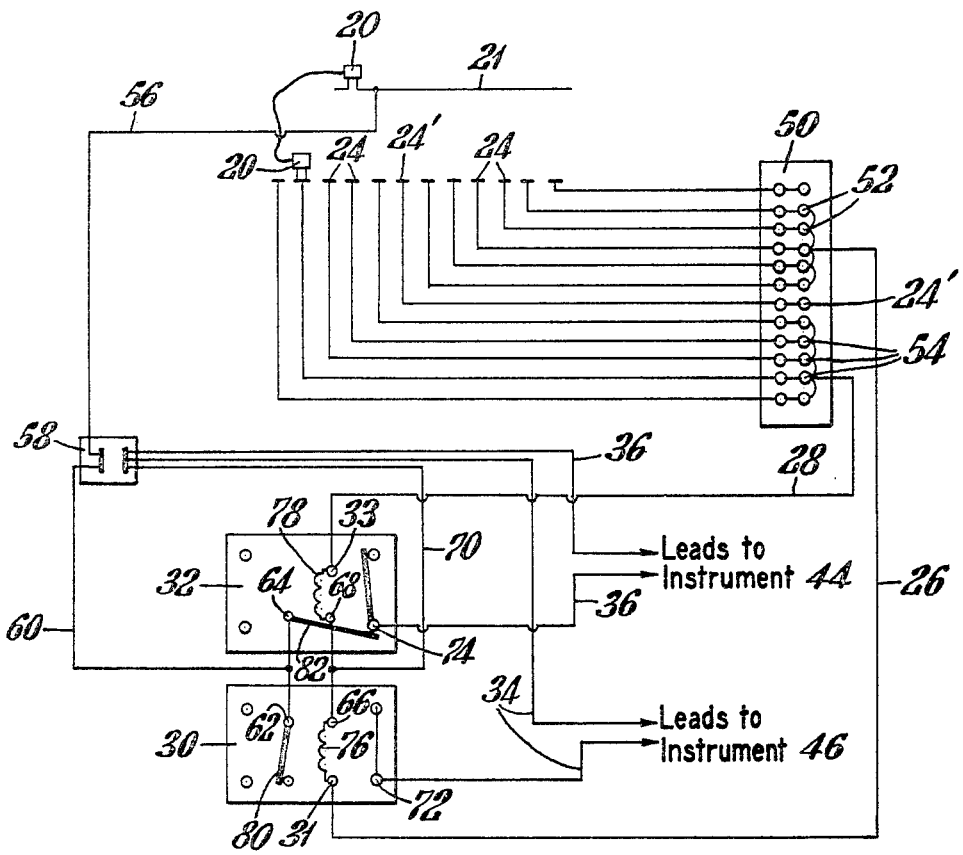
FIGURE 3 is a schematic illustration of a suitable electrical circuit which forms a part of the control device shown in FIGURE 1.

A better understanding of the signal carrying circuit embodied in the device of FIGURE 1 may be obtained by referring to the schematic representation of the circuit illustrated in FIGURE 3. The indicator 20 is joined to one of the contact points 24, the various contact points 24 being electrically connected to a terminal board 50. As indicated, some points are short circuited together in various places as at 52, 54. Connecting means 26, 28 join the short circuited segments to relay terminals 31, 33 on relays 30, 32, respectively. Connecting means 56 electrically joins the indicator 20 to the positive side of a power supply 58, while connecting means 60 conducts the same side of the power supply 58 to terminals 62, 64 on relays 30, 32. The negative side of power supply 58 is carried to instruments 44, 46 via conducting means 34, 36 and to relay terminals 66, 68 through conducting means 70. Relay terminals 72, 74 are joined to instruments 44, 46 by conducting means 34, 36. Relay coils 76, 78 on relays 30, 32 are connected between terminals 31 and 66, and 33 and 68, respectively. Each relay is equipped with a relay arm 80, 82.

In the position illustrated, indicator 20 carries the electrical signal from the positive side of power supply 58 through contact point 24 to the short circuited segment 54 on terminal board 50, from said segment through conducting means 28 to terminal 33 on relay 32. Since terminal 68 is always connected to the negative side of the power supply 58, the coil 78 is energized and relay arm 82 is activated to contact terminal 74 as shown. In this position, the relay arm connects terminals 64 and 74 and, therefore, joins the positive side of the power supply to pollution measuring instrument 44, thus placing both sides of the battery across said instrument, enabling it to be turned ON.

If the indicator 20 is moved to another position such as 24', neither measuring instrument 44, 46 will be turned on since neither is electrically connected to the positive side of the power supply 58. If the indicator 20 is rotated to a posiiton wherein it connects with a contact point 24 in short circuit segment 52, measuring instrument 46 will be activated through relay 30 and, more particularly, contact arm 80 will move to terminal 72, thus carrying the positive side of the power supply to the instrument 46 as above described.

Figure 4:
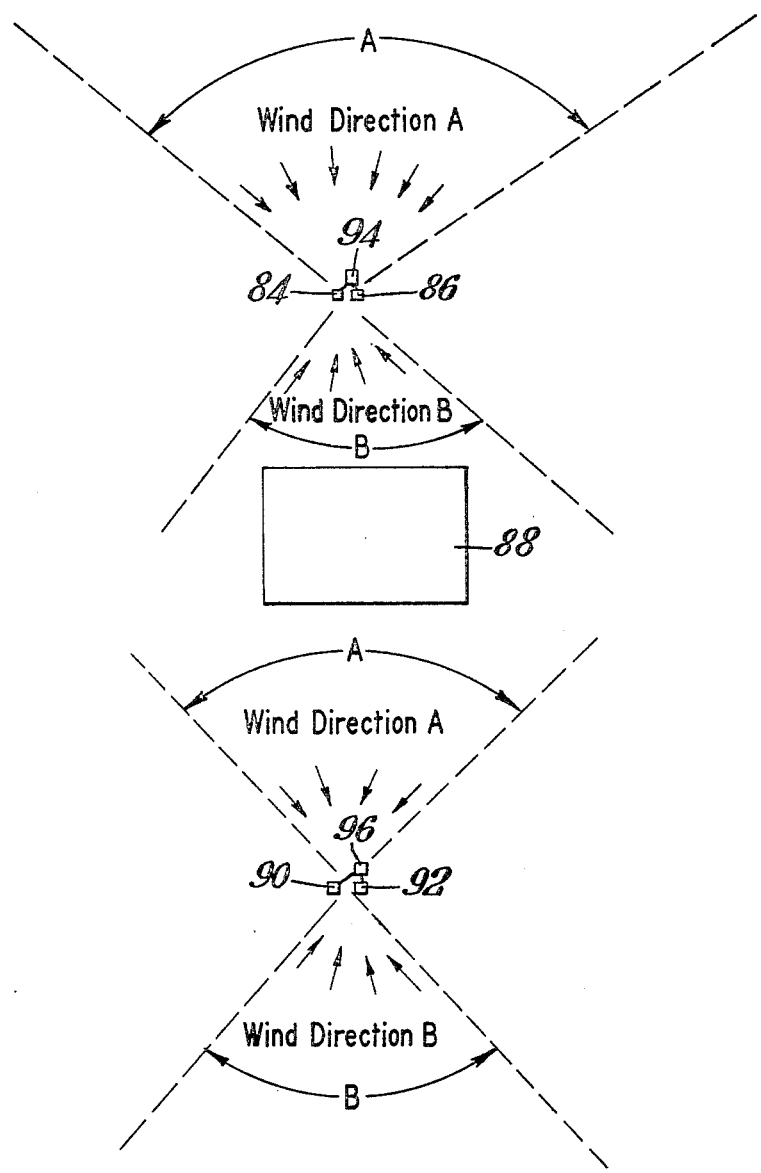
FIGURE 4 is a schematic representation of the operation of the invention in a typical industrial environment.

It will be readily appreciated, therefore, that a pollution measuring instrument may be rendered highly selective if it is operated by the control device of the invention. As illustrated in FIGURE 1 and FIGURE 2, the control device may operate two or more measuring instruments at the same time. This is particularly advantageous when air pollution is to be measured from several directions. FIGURE 4 illustrates this principle.

In FIGURE 4, pollution measuring instruments 84, 86 are located on one side of an industrial pollution source 88, while measuring instruments 90, 92 are positioned on the opposite side of said source. Each pair of instruments is operated by a control device such as at 94, 96. The control devices are designed to activate instruments 84 and 90 when the wind is in "wind direction A" as illustrated by the arrows and the angle A as defined by the dotted lines. The difference between the quantity of air contamination measured by instrument 90 and that measured by instrument 84 is a fairly exact measurement of the contamination generated by source 88, since the instrument 90 will collect the same air contaminants as did instrument 84 and will also measure the addition to the wind stream due to the source 88. In like manner, instruments 92 and 86 will together measure the air contamination deposited by the source 88 when the wind is in the opposite direction, as depicted by the arrows designating "wind direction B" and as defined by angle B in FIGURE 4.

It will be appreciated that the angle A or B of wind direction within which a control device will activate a measuring instrument can be varied over a wide range of values in accordance with the many variables which must be considered. For example, if a large factory is the source and the measuring instruments are placed fairly close to the source on either side thereof, a small angle of activation is all that is required. Of course, the converse situation will require a larger angle.

The angle of activation may easily be varied in the device of the invention by simply short circuiting more or less contact points in the manner illustrated in FIGURE 2. Of course, the sensitivity or selectivity of the system may be refined by placing more or less contact points on the periphery of the dial. Thus, if 12 points are equally spaced on the periphery, each point represents approximately a 30° increment in wind direction. The spacing between contact points 24 in FIGURE 1 and FIGURE 2 is exaggerated for illustrative purposes and it is apparent that excellent control may be achieved with 12 contact points by making each contact point wide enough so that the unused space between each point will be insignificant and little, if any, "dead" space will exist. Of course, other devices such as "make before break" switches which are well known in the art may readily be employed.

It will further be appreciated that a great number of modifications of the instant invention may be made without departing from the scope of the invention. For example, the sensor 12 (FIGURE 1) need not be of the type shown but can be fabricated of any material light enough to be rotated easily by the wind and can be shaped into any configuration which will enable it to function properly. For instance, a plurality of sails projecting outwardly from the rod and positioned about the periphery of the rod will suffice.

The dial, indicator and contact point configuration can be modified by substituting a commercially available multi-positioned rotary switch therefor. In addition, the relays need not be of the type described; any switching means such as transistor switches or other solid state devices capable of functioning in an equivalent manner are acceptable. It will be further appreciated to one skilled in the art that the switching means are employed to limit the arcing at the contact points. If an electrical device with a high enough input impedance were to be connected to the control device, the switching means could be eliminated.

As hereinbefore mentioned, the pollution measuring instruments may be of any type capable of measuring air pollution during a prescribed interval of time and capable of being turned ON or OFF by the presence or absence of an electrical signal. One such device is a "Hi Vol Sampler," Model 2000, manufactured by General Metal Works Corporation, Cleveland, Ohio.

In order to determine the effectiveness of the instant invention, several "Hi Vol Sampler" pollution measuring instruments were turned "ON" for 24 hours in the vicinity of an industrial factory in New York. Simultaneously, several other "Hi Vol Sampler" instruments which were operated by control device of the instant invention were placed near the uncontrolled instruments and were arranged in the manner illustrated in FIGURE 4. The control devices employed were characterized by a sensor of the type illustrated in FIGURE 1 which was fabricated of white pine wood and was 18 inches long with a tail section 4 inches high and a maximum body width of 1⅜ inches. The rod was 22 inches long and was composed of stainless steel. The housing means was constructed primarily of fiber glass and had dimensions of approximately 5 inches wide, 8 inches in depth, and 11 inches height. Twelve contact points, each covering approximately 28° of dial arc, were made of brass. A 110 volt power supply supplying a current of 8 amps to each "Hi Vol Sampler" was positioned within the housing means. Electromechanical relays rated at 60 cycle, 110–115 volts and 25 amperes were placed in each control device. The control devices were set to turn the "Hi Vol Samplers" to the ON position only when the wind was from north-northeast direction over the various ranges set forth in the following table. Each "Hi Vol Sampler" was equipped with a timer which had a range of 24 hours. The uncontrolled "Hi Vol Samplers" were in continuous operation over the 24 hour intervals, the data being obtained once a day. Because the controlled "Hi Vol Samplers" were turned ON only when the wind was in a specific direction, as much as a month was required before the timer travel its fully 24 hour range and the data was obtained.

Each measuring instrument was provided with an 8 inch by 10 inch standard fiber glass filter and an air flowmeter. Periodic flowmeter readings were obtained over the 24 hour measuring time and an average air flow rate through the filter was calculated. At the end of each measuring period, the quantity of dirt trapped in the filter was measured and this quantity was mathematically divided by the average flow rate through that filter to obtain the number of micrograms per cubic meter of air. The variation of this measurement in any one "Hi Vol Sampler" over a period of several 24 hour time measurement intervals is a good indication of the variation in quantity of air contaminants over the operable range of the measuring instruments.

The following table compares the variation in this measurement for controlled as well as uncontrolled measuring instruments. The "Deviation Factor" is the highest measurement (micrograms per cubic meter) divided by the lowest measurement obtained in each "Hi Vol Sampler" during the periods tested while the "Angle of Measurement" indicates the range of wind direction over which the "Hi Vol Sampler" was operating.

| Sampler instrument | Angle of measurement (deg.) | Deviation factor for 24 hour measurements |
|---|---|---|
| 1 | Uncontrolled | 18.8 |
| 2 | Uncontrolled | 12.0 |
| 3 | 60 | 1.3 |
| 4 | 90 | 1.9 |
| 5 | 180 | 4.4 |
| 6 | 210 | 7 |

The table clearly indicates that the smaller the "Angle of Measurement," the smaller is the "Deviation Factor." Thus, the quantity of pollution from a single source can readily be measured if the control device of the invention is employed since contaminants from undesirable directions will be rejected by the measuring instrument. Large variations will not occur unless the source being measured is itself responsible for the variations. It can be appreciated that a reliable measurement of actual pollution generated by a single source can be achieved by subtracting the values measured by two controlled instruments properly positioned.

What is claimed is:
1. A method for measuring the air pollution generated from a single source comprising,
 (a) positioning first and second control devices on opposite sides of said source, said control devices having means for sensing atmospheric wind direction and means for transmitting a signal in response to a specific wind direction;
 (b) adjusting said control devices such that each device transmits a signal when said wind direction is in a direction so as to sequentially contact said first device, said source and then said second device;
 (c) connecting first and second air pollution measuring instruments to said first and second control devices respectively, said measuring instruments being activated by said signals from said control devices to measure the air pollution on each side of said source in the direction of said wind; and
 (d) determining the difference between said second measuring instrument and said first measuring instrument to thereby obtain the quantity of pollution generated by said source.

References Cited
UNITED STATES PATENTS 2,699,679  1/1955  Munger _____ 73—170
3,299,700  1/1967  Stout _____ 73—170

RICHARD C. QUEISSER, Primary Examiner

JERRY W. MYRACLE, Assistant Examiner